Jan. 12, 1954  K. SCHWEINGRUBER  2,666,116
ELECTRIC SWITCHING APPARATUS CONTROLLED BY SOLAR RADIATION
Filed Nov. 19, 1951  2 Sheets-Sheet 1

Inventor
K. Schweingruber
By Glascock Downing Diebold
Attys.

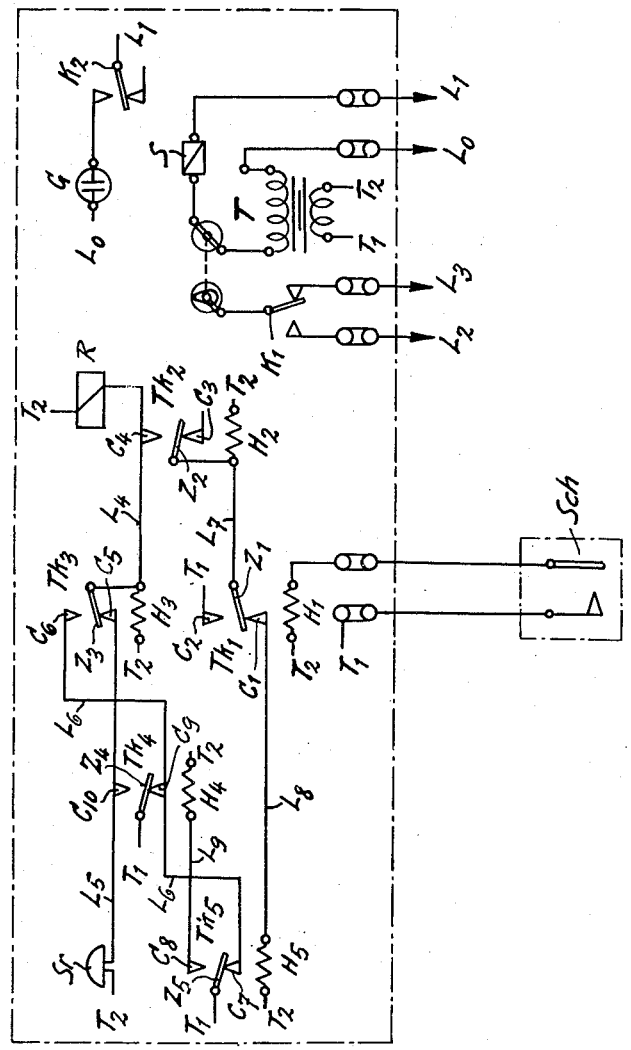

Patented Jan. 12, 1954

2,666,116

UNITED STATES PATENT OFFICE 2,666,116

ELECTRIC SWITCHING APPARATUS CONTROLLED BY SOLAR RADIATION

Kurt Schweingruber, Zurich, Switzerland

Application November 19, 1951, Serial No. 257,111

1 Claim. (Cl. 200—141)

The present invention relates to a switching apparatus controlled by solar radiation.

Of the known appliances of the kind, the switching apparatus as per invention is distinguished by a substantially U-shaped and sealed tube consisting of some electrically insulating material, being in the lower rounded portion of its two shanks filled with an electric contact fluid, one of the higher ends thereof intended for exposure to the sun, exhibits a dark heat-absorbing coloration, whereby two electric contact elements are provided, of which one—with balanced co-planar fluid level in the two tube shanks—opens into the tube above this level and the other below it.

The accompanying drawing shows by way of example a preferred embodiment incorporating the invention.

Figure 1:
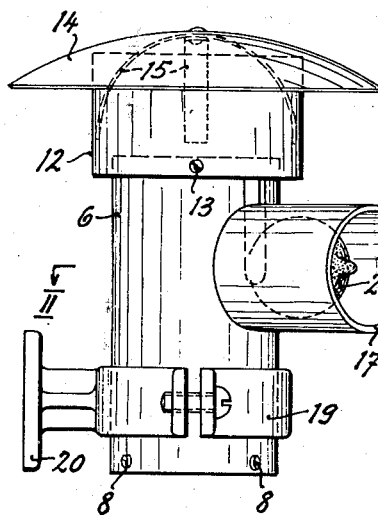
Figure 3:
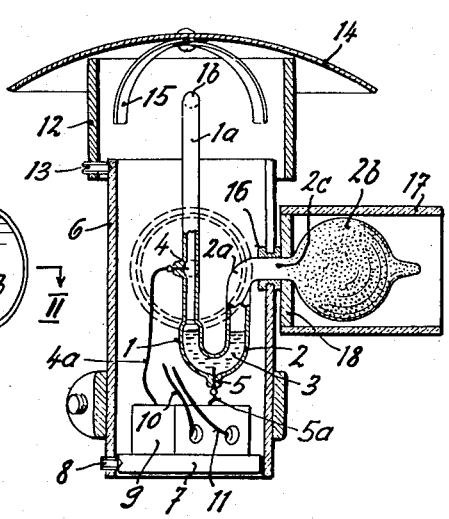
Figure 2:
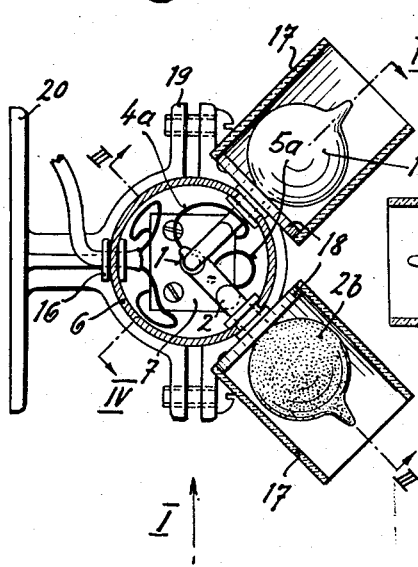
Figure 4:
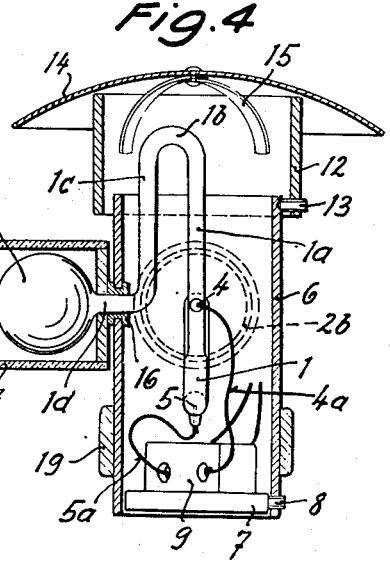

Fig. 1 is a lateral view of the switching apparatus seen in direction of the arrow I indicated in Fig. 2, Fig. 2 is a horizontal section taken on the line II—II of Fig. 1, Fig. 3 is a vertical section taken on the line III—III of Fig. 2, Fig. 4 is another vertical section taken on the line IV—IV of Fig. 2, and Fig. 5 shows a wiring diagram.

In the form illustrated, numerals 1 and 2 designate the two shanks of a substantially U-shaped and sealed tube made of some electrically insulating material, say glass, being filled in the lower rounded portion with an electric contact fluid 3, say mercury. The shank 1 has an upward extension 1a which through a bend 1b and a descending section 1c passes over into a horizontally disposed tube portion 1d which at its end carries a spherical enlargement 1e. At location 2a the tube shank 2 is bent off at right angles and merges at its end likewise into a spherical enlargement 2b which is frosted externally and exhibits a dark coloration absorbing the heat rays. Numerals 4 and 5 denote the ends of two electric wires passing through the wall of the tube 1, 2 and with balanced co-planar mercury level in the two tube shanks one of said wires 4 terminates into the tube above said level, and the other 5 below it.

For protection against mechanical breakage, the portions 1, 2, 1a and 1c of the tube are arranged in a casing which consists of a cylindric piece 6 having a bottom 7 attached thereto by screws 8 adapted to serve for connecting the wires 4a, 5a to those 10 and 11 brought out of the casing 6. The cylinder 6 carries a top piece 12 of larger diameter, attached thereto by screws 13. The top piece 12 is closed by a dome-shaped lid 14 having at its underside two leaf springs 15 secured thereon. Said leaf springs engage under tension the inner side of the top piece 12 (Fig. 1), thus frictionally holding the lid 14 thereto. The wall of the cylinder 6 is pierced by the tube sections 1d and 2c within insulating bushes 16 so that the spherical ends 1e and 2b intended for exposure to the sun come to lie outside the cylinder 6. To prevent heat losses by convection, say, in the case of intense air movements, the spherical ends of the tube, filled with an indifferent gas, say nitrogen, are each surrounded by a protective jacket 17 permeable to heat rays and consisting, say, of glass. In the example illustrated such protective jackets are formed by tubular glass pieces being at one end each put onto a rubber disc 18 riding on the tube sections 1d, 2c. Numeral 19 designates a pipe clip embracing the casing part 6 and which has a bracket 20.

By means of said bracket 19, 20 the aforedescribed switching apparatus is attached to the outside of the building within the range of the displays or shop windows to be protected from solar radiation. As soon as the spherical tube ends 1d and 2b become exposed to the sun, the gas therein gets warmed and tends to expand. Due to the frosting and darkening of the spherical member 2a, the gaseous substance therein gets more warmed than the gas in the spherical member 1e. As a result, the mercury in the rounded bottom section of the tube shanks 1, 2 is driven up into the extension 1a of shank 1, thus closing the current circuit between the wire ends 4 and 5 as soon as the mercury column in tube shank 1 or 1a reaches the level of the wire end 4.

The aforedescribed switching apparatus may either be put into the circuit of an alarm device or into the control circuit of a motor for actuating sun blind disposed over window displays to be protected. As soon as the circuit between the wire ends 4 and 5 becomes closed by the mercury column rising in shank 1a, a sun blind-actuating motor will either be inserted or an acoustic, optic or combined alarm signal be tripped, thus drawing the attention to the fact that the displays or shop windows are exposed to the sun and that the blinds should be actuated.

As soon as the spherical members 1e and 1b are no longer exposed to the sun, the gas therein will cool and thus cause the mercury column in the tube shank to drop. As soon as the level of the mercury column in the tube shank 1a falls below the wire end 4, the current circuit between the contact elements 4 and 5 will be interrupted and thus an alarm signal be tripped, or the motor for raising the sun blinds be set in operation. Due to the fact that the spherical member 2b is not suddenly cooled after the sun has ceased to act and that consequently contraction of the gas within the spherical member cannot instantaneously take place, the fluid contact between the contact elements 4, 5 is prevented from being broken by temporary interruption of solar radiation caused by a cloud passing across the sun. As a result of the darkening of one spherical member 2b the switching apparatus is only set in action by heat radiation, but not by heat convection, inasmuch as both spherical members 1e and 2b are evenly warmed by convection, so that the rise in gas pressure in both members ensues evenly and the level of the contact fluid remains undisturbed.

Fig. 5 diagrammatically shows the aforedescribed switching apparatus as put into the wiring diagram of an installation. Therein Sch marks the switching apparatus, T a transformer, T1 and T2 the wires connected to the secondary coil, Tk1 to Tk5 are five thermal contacts with the pertinent heating elements H1 to H5, S being a fuse, Sr a buzzer, G a glowing lamp, L0 and L1 the line conductors, L2 and L3 the wires leading to contactor and motor for actuating the sun blinds, R is a relay and K1 and K2 its contacts for changing over.

The action of the system illustrated in the diagram is as follows:

When the solar heat acts upon the switching apparatus Sch, the circuit connected to the terminals T1 and T2 of the secondary coil of the transformer is closed. Incidentally the heating coil H1 of the thermalcontact Tk1 gets warmed, thus causing the contact stud Z1, say of a bimetallic strip, to bend upwards and move clear of the contact element C1. After about two minutes the contact stud Z1 engages the contact element C2. Thus a further circuit will be closed which extends from the secondary coil of the transformer via wire T1, contact element C2, contact tongue Z1 through the heating coil H2 of the thermocontact Tk2 and over the wire T2 back to the transformer. Thereby the heating element H2 gets warmed, thus causing the contact stud Z2 to move clear of the contact element C3 and towards the contact element C4. After about two minutes the contact stud Z2 engages the contact element C4, thus closing a further circuit: T1, C2, Z1, L7, Z2, C4 and via relay R to T2. A branch of this current passes through wire L4, contact stud Z3, contact element C5, wire L5 via buzzer Sr to T2, thus setting the buzzer in operation. From the wire L4 a current branch passes through the heating element H3 of the thermalcontact Tk3 to T2, thus warming up said element and causing the contact stud Z3 to move towards the contact element C6. As the contact stud Z3 moves clear of the element C5, the circuit of the buzzer Sr will be interrupted, i. e. about 30 seconds after its starting. After further 30 seconds approximately the contact stud Z3 engages the element C6, thus closing the following guarding circuit for relay R: T2, R, L4, Z3, C6, L6, Tk4 via C7+C9 and Z5+Z4 to T1. Thus the working condition of the system will be established which lasts so long as the switching apparatus Sch is exposed to the sun. The relay R includes two change-over contacts for 220 volts + 4 amperes. Its contact K1 controls the contactor (lines L2 and L3) while the contact K2 controls the glowing lamp G.

Upon interruption of solar radiation onto the switching apparatus Sch, the latter interrupts after a short while the current supply to the heating coil H1 of the thermal contact Tk1 so that this cools off. Incidentally the contact stud Z1 moves towards the lower contact element C1. After about two minutes it engages the latter, thus setting alive the heating coil H5 of the thermal contact Tk5, i. e. via T1 of thermal contact Tk4, further via L6, C6, Z3, Z4, C4, Z2, L7, Z1, C1, L8, H5 to T2. After about two minutes the thermal contact Tk5 changes over, thus causing the contact stud Z5 to engage the element C8 and to close a circuit of T1, Z5, C8, L9 via H4 to T2, whereby the coil H4 of the thermal contact Tk4 will be warmed up. Incidentally the contact stud Z4 moves clear of the element C9 to engage then the contact element C10 after a while. When the contact stud Z4 moves clear of the contact element C9, the relay R becomes dead. Thereby the contactor connected to contact K1 is again actuated so that the motor is now caused to rotate in opposite direction, thus raising the sun blinds. Simultaneously the signal lamp G lying on contact K2 is extinguished. The thermal contact Tk4 works somewhat quicker than the thermal contacts Tk1, Tk2, Tk3 and Tk5. The contact stud Z4 engages the contact element C10 after about fifteen seconds, the circuit being reclosed via buzzer and set in operation. This gives the signal that the sun blinds will be raised. This signal lasts about 20 seconds.

Upon insertion of the thermal contact Tk4 as aforementioned, the thermal contacts Tk3, Tk2 and Tk5 also become dead and cool off. Thus after about thirty seconds the circuit T1 will be interrupted from Tk5 via Z5, C8, L9 and H4 to T2. With the cooling of the heating coil H4 the circuit of the buzzer will be interrupted. Upon cooling of all thermal contacts the apparatus is again set at rest.

The retardation for switching-on the installation lasts about three and a half minutes without the retardation of the switching apparatus, whereas the retardation for the switching-off takes about four minutes.

A further switch may be put into the aforedescribed diagram, by means of which the installation may be changed over from automatic to manual operation. When set on "manual operation" the motor for raising the blinds will not be automatically inserted, but alarm signals will be actuated, whereupon the motor should be inserted by hand.

In connection with the different diameters of the tube shanks 1a and 2 the volume of both spherical members 1e and 2b is so dimensioned that with even changes of the outside temperature or of the spherical members 1a and 2b the level of the mercury column in the tube shank 1a remains unchanged.

The rest position of the mercury columns is preferably set at the highest possible surrounding temperature, say at about 50° C.

What I claim is:

An electric switching apparatus for control by solar radiation, comprising a vertically arranged tube of electrical insulating material and having at both its upper and lower ends U-bends to provide upwardly and downwardly extending vertical leg portions, a spherical enlargement at the end of each leg portion and in communication therewith; one only of said spherical enlargements having its external surface frosted and darkened to selectively absorb a greater proportion of incident radiation than that absorbed by the other enlargement, a body of mercury in the lower bend of said device, the remainder thereof containing a gaseous atmosphere, and respective contacts, one disposed in the lower bend of said device and the other in the vertical central tube above the level of said mercury when the pressures in said enlargements are equal, whereby said body of mercury will complete a connection between said contacts in response to solar radiation impinging upon said darkened enlargement.

KURT SCHWEINGRUBER.

References Cited in the file of this patent

UNITED STATES PATENTS

| Number | Name | Date |
|---|---|---|
| 484,386 | D'Almeida et al. | Oct. 18, 1892 |
| 1,733,615 | McCabe | Oct. 29, 1929 |
| 1,805,966 | Armstrong et al. | May 19, 1931 |
| 1,819,077 | DeFilippi | Aug. 18, 1931 |